US010374659B2

(12) United States Patent
Mukundagiri et al.

(10) Patent No.: US 10,374,659 B2
(45) Date of Patent: Aug. 6, 2019

(54) LOW LATENCY DATA TRANSFER IN A SYSTEM FOR WIRELESS POWER TRANSMISSION

(71) Applicant: Texas Instruments Incorporated, Dallas, TX (US)

(72) Inventors: Vinod Mukundagiri, Dallas, TX (US); Sudipto Chakraborty, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 344 days.

(21) Appl. No.: 15/140,979

(22) Filed: Apr. 28, 2016

(65) Prior Publication Data

US 2017/0104508 A1 Apr. 13, 2017

Related U.S. Application Data

(60) Provisional application No. 62/240,269, filed on Oct. 12, 2015.

(51) Int. Cl.
*H04B 5/00* (2006.01)

(52) U.S. Cl.
CPC ......... *H04B 5/0031* (2013.01); *H04B 5/0037* (2013.01)

(58) Field of Classification Search
CPC ............................ H04B 5/0031; H04B 5/0037
USPC .......................................................... 307/104
See application file for complete search history.

(56) References Cited

U.S. PATENT DOCUMENTS

2006/0056357 A1* 3/2006 Payne .................. H04B 7/0811 370/334
2006/0068740 A1* 3/2006 Yokoyama .............. H04B 1/28 455/302
2012/0252396 A1* 10/2012 Xie .......................... H04B 1/28 455/334
2014/0036973 A1* 2/2014 Au ........................ H03F 1/3247 375/221

* cited by examiner

*Primary Examiner* — Tomi Skibinski
(74) *Attorney, Agent, or Firm* — Lawrence J. Bassuk; Charles A. Brill; Frank D. Cimino

(57) ABSTRACT

A method, receiver and system for isolated wireless data transfer are disclosed. The receiver includes a switching mixer connected to receive a data signal and a local oscillator signal and to output a mixed differential signal, a programmable gain amplifier using an operational transconductance amplifier (OTA) and resistive feedback, the OTA connected to receive the mixed differential signal and to provide an amplified differential signal to a polyphase filter, and an analog demodulator to demodulate the output of the polyphase filter and provide digital output.

21 Claims, 7 Drawing Sheets

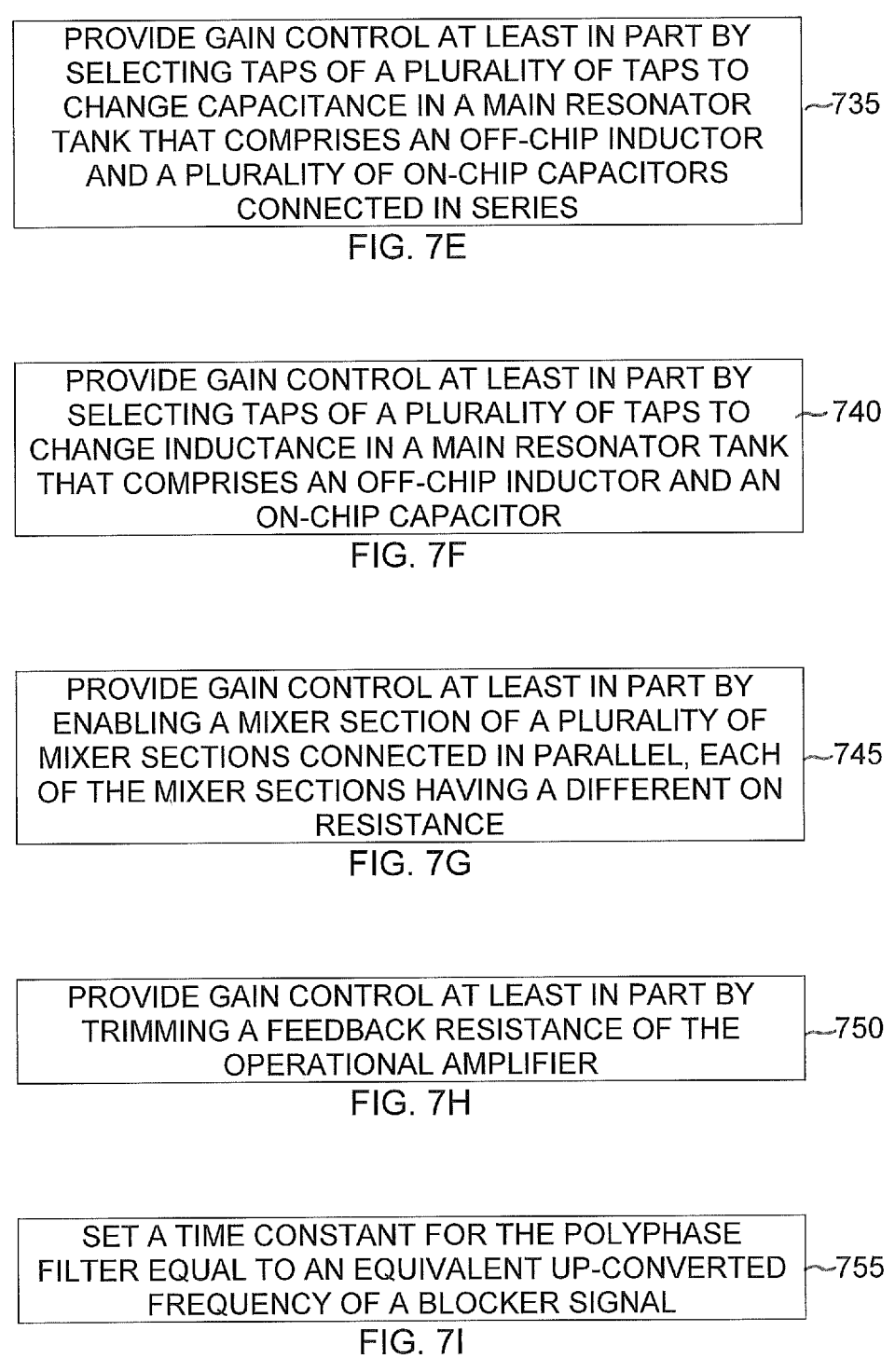

PROVIDE GAIN CONTROL AT LEAST IN PART BY SELECTING TAPS OF A PLURALITY OF TAPS TO CHANGE CAPACITANCE IN A MAIN RESONATOR TANK THAT COMPRISES AN OFF-CHIP INDUCTOR AND A PLURALITY OF ON-CHIP CAPACITORS CONNECTED IN SERIES 735

FIG. 7E

PROVIDE GAIN CONTROL AT LEAST IN PART BY SELECTING TAPS OF A PLURALITY OF TAPS TO CHANGE INDUCTANCE IN A MAIN RESONATOR TANK THAT COMPRISES AN OFF-CHIP INDUCTOR AND AN ON-CHIP CAPACITOR 740

FIG. 7F

PROVIDE GAIN CONTROL AT LEAST IN PART BY ENABLING A MIXER SECTION OF A PLURALITY OF MIXER SECTIONS CONNECTED IN PARALLEL, EACH OF THE MIXER SECTIONS HAVING A DIFFERENT ON RESISTANCE 745

FIG. 7G

PROVIDE GAIN CONTROL AT LEAST IN PART BY TRIMMING A FEEDBACK RESISTANCE OF THE OPERATIONAL AMPLIFIER 750

FIG. 7H

SET A TIME CONSTANT FOR THE POLYPHASE FILTER EQUAL TO AN EQUIVALENT UP-CONVERTED FREQUENCY OF A BLOCKER SIGNAL 755

FIG. 7I

LOW LATENCY DATA TRANSFER IN A SYSTEM FOR WIRELESS POWER TRANSMISSION

CLAIM OF PRIORITY AND RELATED PATENT APPLICATIONS

This nonprovisional application claims priority based upon the following prior United States provisional patent application(s): (i) "SYSTEM FOR ISOLATED WIRELESS DATA TRANSFER WITH HIGH IMMUNITY TO NOISE FROM POWER PATH," Application No.: 62/240,269, filed Oct. 12, 2015, in the name(s) of Vinod Mukundagiri and Sudipto Chakraborty, which is hereby incorporated by reference in its entirety.

FIELD OF THE DISCLOSURE

Disclosed embodiments relate generally to the field of wireless power communication. More particularly, and not by way of any limitation, the present disclosure is directed to low latency data transfer in a system for wireless power transmission.

BACKGROUND

Various systems for providing both power and data communication wirelessly are growing. In applications such as automotive, the use of wired communication of data has been common, but increases assembly complexity. Where wired systems have been replaced by wireless transmission of power and data, signal detection of the data (in case of an on-off keying (OOK) modulated signal) has used bandpass filtering at the data communication frequency followed by envelope detection. Bandpass filtering is essential for wireless systems to filter out unwanted blocker signals, and is important to improve signal to noise ratio (SNR) at the demodulator. This approach, however, leads to higher power and area and thus higher cost. Improved methods of data signal detection are needed. Additionally, bandpass filters typically use moderate to high quality factor in their implementation, which leads to increased latency and inter-symbol interference (ISI). This requires more time for the demodulator to resolve bit-decision, leading to further increase in latency.

SUMMARY

Disclosed embodiments implement a method and receiver for data communication in a wireless power transfer system. The disclosed embodiments provide a radio-based down conversion architecture with minimum loading to a high impedance resonating antenna coil. The architecture can include one or more of the following: a resistively degenerated down-conversion mixer with quadrature phases, a variable gain amplifier that may provide a suitable trade-off between selectivity and sensitivity while achieving precise gain, a multi-stage passive polyphase filter to provide filtering of frequency up-converted power path noise with high passband bandwidth (to reduce latency), a low power analog demodulation/detection of the incoming data-path signal. Note that at least one quadrature mixer is used, and a cascade of more quadrature mixers for the purposes of image rejection may also be used in case of operating at the commonly used industrial, scientific and medical (ISM) bands (country specific and/or world-wide). Hence, the carrier frequency used for data communication via the contact-less interface (CLIF) shall be programmable via an on-chip frequency synthesizer.

In one aspect, an embodiment of a receiver for isolated wireless data transfer is disclosed. The receiver includes a switching mixer connected to receive a data signal and a local oscillator signal and to output a mixed differential signal; a programmable gain amplifier using an operational transconductance amplifier (OTA) and resistive feedback, the OTA connected to receive the mixed differential signal and to provide an amplified differential signal to a polyphase filter; and an analog demodulator to demodulate the output of the polyphase filter and provide digital output.

In another aspect, an embodiment of a method of providing isolated wireless data transfer in the presence of wireless power transfer is disclosed. The method includes mixing a data signal and a local oscillator signal and outputting a mixed differential signal; receiving the mixed differential signal at a programmable gain amplifier that uses an operational transconductance amplifier (OTA) and resistive feedback and providing an amplified differential signal to a polyphase filter; and receiving an output of the polyphase filter at an analog demodulator.

In yet another aspect, an embodiment of a system for isolated wireless power and data transfer is disclosed. The system includes a power transmitter; a power receiver; a data transceiver comprising a transmitter and a receiver, the receiver comprising a switching mixer connected to receive a data signal and a local oscillator signal and to output a mixed differential signal, a programmable gain amplifier using an operational transconductance amplifier (OTA) and resistive feedback, the OTA connected to receive the mixed differential signal and to provide an amplified differential signal to a polyphase filter, and an analog demodulator to demodulate the output of the polyphase filter and provide digital output.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

FIGS. 7A-7I depict a method of providing isolated data transfer in the presence of isolated power transfer.

DETAILED DESCRIPTION OF THE DRAWINGS

Figure 1:
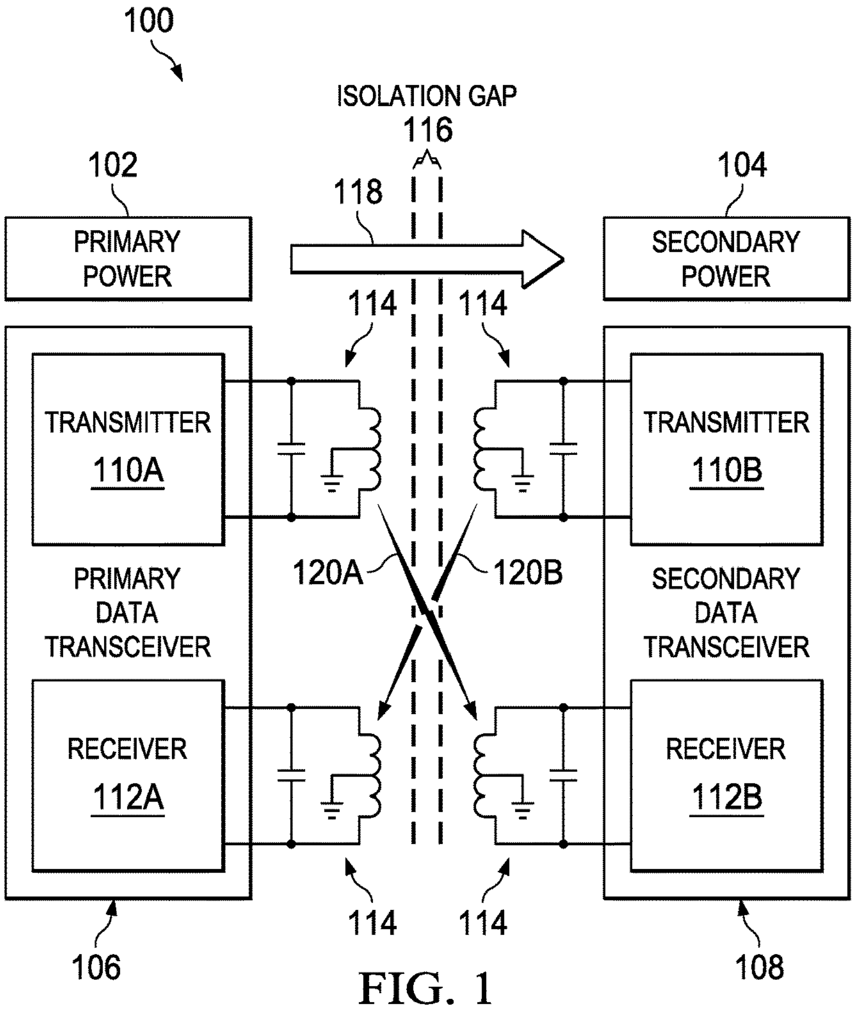
FIG. 1 depicts an example of system for wireless power and data transmission in which an example receiver can be used according to an embodiment of the disclosure.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

Wireless power communication transfers both power and data across a physical gap that isolates the transmitter from the receiver. The two signals are provided in proximity to each other so that the power path signal magnetically couples to the signal in the data path. Wireless communication along the power and the data paths occurs at two different frequencies, which are generally known and precise. These frequencies are programmable, but are known a-priori for a given application (i.e. not arbitrarily variable after their values have been determined). The power path typically uses a low frequency, resulting in a significantly higher energy in the data path signal relative to the desired data signal itself. Since many of the applications are replacing existing wire based schemes, demodulation of the data path signal must be performed with low power consumption and very low latency to ensure high throughput and near-zero bit loss. The solution provided herein is scalable with respect to signal strength, relative power path coupling, modulation scheme, data rates, and center frequencies.

The disclosed embodiments use a mixer-based approach and process signals using the equivalent of a low pass filter to achieve low power consumption. Gain that is achieved in the first stage is used to swamp the noise from subsequent stages, resulting in high resistance and low capacitance that can be used to reduce the area of the filtering circuit. Built-in-self calibration can be employed anytime during the product's lifetime to ensure robust operation. Embodiments can provide one or more of the following advantages:

- High pass-band bandwidth for a polyphase notch filter greatly reduces latency, provides high linearity, while rejecting deterministic power path blocker signal at the expense of minimum power (power is attributed to the driving circuit as the inherent structure doesn't consume any power)
- The implementation is fully on-chip for both components and Automatic Gain Control (AGC);
- Low power is achieved as a combination of low supply voltage and proposed architecture;
- Built-in-self calibration can be employed for robust operation and determines ordering of the phases for cancellation of the up-converted power path signal coupled from the power path;
- The receiver provides low distortion and low power, resulting in high dynamic range per milliwatts used;
- The polyphase filter time constant is not set by the data path bandwidth and provides an inherently fast settling time compared to traditional filter based approaches whose time constant is set by message bandwidth.

Turning first to FIG. 1 a high-level view of a system 100 for isolated power and data transfer is shown according to an embodiment of the disclosure. System 100 includes Primary Power 102, which is separated from Secondary Power 104 by Isolation Gap 116. Power is transmitted from Primary Power 102 to Secondary Power 104 at a known low frequency as Signal 118. In at least one embodiment, the power is transmitted at 6.78 MHz. System 100 also includes Primary Data Transceiver 106 and Secondary Data Transceiver 108. Primary Data Transceiver 106 includes Transmitter 110A and Receiver 112A, each of which is connected to an Inductor-Capacitor (LC) tank 114. Secondary Data Transceiver 108 includes Transmitter 110B and Receiver 112B, each of which is also connected to an LC tank 114. Communication between the primary and secondary side of the system takes place across Isolation Gap 116 in full duplex communication, i.e., Transmitter 110A transmits to Receiver 112B as Signal 120A and Transmitter 110B transmits to Receiver 112A as Signal 120B. In at least one embodiment, Receiver 112A and Receiver 112B are identical circuits. In at least one embodiment, Isolation Gap 116 measures in the range of 1-2.5 mm. In at least one embodiment, Isolation Gap 116 measures up to several tens of MM.

Figure 2:
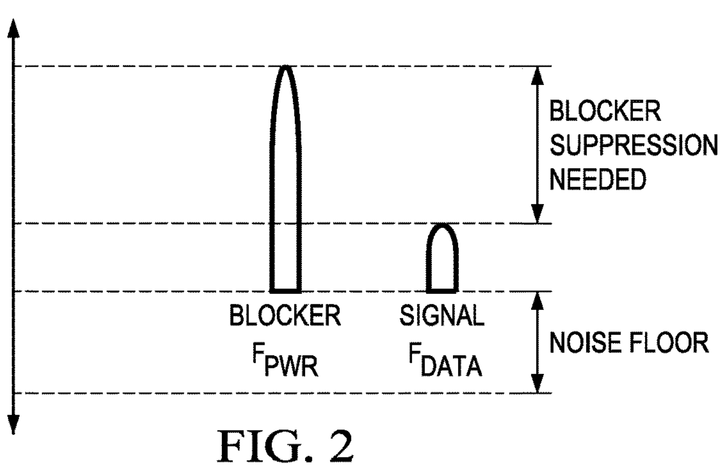
FIG. 2 schematically illustrates the issue of noise from the primary power transmitter that needs to be overcome to decode the data signal.

FIG. 2 illustrates challenges in the design of a wireless receiver that is part of a wireless power transmission system. Power Harmonics of Signal 118 provide a strong blocker signal at frequency $F_{PWR}$, which in this embodiment is 6.78 MHz, swamping out Data Signals 120, at frequency $F_{DATA}$, which in this embodiment is 80 MHz±2 MHz. To recover the transmitted data, unwanted components that are coupled to the received data must be removed, such as the blocker signal at 6.78 MHz, as well as any other noise that may be present in the environment. Based on the power transmitted and the distance in the example embodiment, a minimum blocker suppression of 40 dBc is needed.

In at least one embodiment, the disclosed power and data transmission system is used to replace a previously wired connection, which imposes a high Bit Error Rate (BER) requirement on the system. The Signal-to-Noise Ratio (SNR) for an ASK modulation scheme has a typical requirement of 10 dB. System latency also needs to be low, which places a minimum requirement on propagation delay to allow for different transmission standards of ten percent of the bitrate. It is also important to provide a robust solution to account for variations in signals and/or components, such as variations in the coils and other external factors. Flexibility is necessary to adjust to different power levels and distances.

Figure 3:
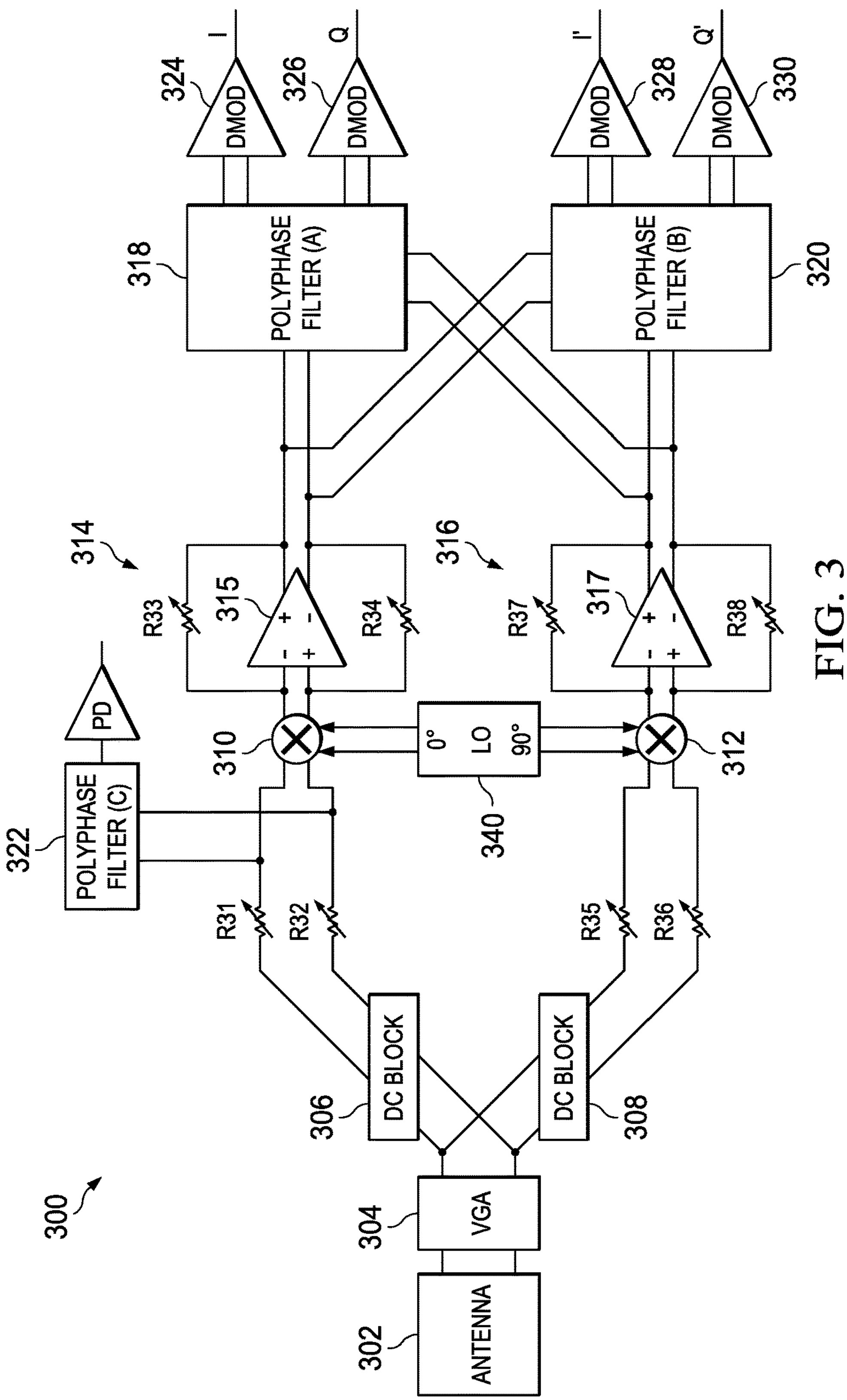
FIG. 3 depicts a schematic of a data receiver circuit according to an embodiment of the disclosure.

FIG. 3 discloses a schematic view of Data Receiver 300 according to one embodiment of the disclosure. As shown here, Antenna 302 is coupled to provide differential outputs to Variable Gain Attenuator (VGA) 304, although Antenna 302 may also be configured to provide a single-ended output, as will be explained below. VGA 304 is coupled to Mixer 310 through variable Resistors R31, R32 and optionally through DC Block 306; VGA 304 is also coupled to Mixer 312 through variable Resistors R35, R36 and optionally through DC Block 308. Mixer 310 is further coupled to receive inline differential signals from Local Oscillator (LO) 340 and to provide differential outputs to Programmable Gain Amplifier 314, which includes OTA 315 and resistive feedback that includes Variable Resistors R33, R34. Programmable Gain Amplifier 314 is connected to provide differential outputs to Polyphase Filter A 318 and Polyphase Filter A 318 is connected to provide outputs to Analog Demodulators (DMOD) 324, 326, which are connected to provide their outputs to simple slicers for decoding. Additionally, Polyphase Filter C 322 can optionally be connected between Variable Resistors R31, R32 and Mixer 310 as will be explained below. Similarly, Mixer 312 is further coupled to receive quadrature differential signals from LO 340 and to provide differential outputs to Programmable Gain Amplifier 316, which includes OTA 317 and feedback loops that include Variable Resistors R37, R38. Programmable Gain Amplifier 316 is connected to provide differential outputs to Polyphase Filter B 320 and Polyphase Filter B 320 is connected to provide outputs to Analog Demodulators 328, 330, which provide digital outputs. Polyphase Filters 318, 320 can be operated in differential mode or quadrature. In at least one embodiment, shown in this figure, Polyphase Filters 318, 320 are operated in quadrature mode and the outputs from Programmable Gain Amplifiers 314, 316 are cross-connected so that each of Programmable Gain Amplifiers 314, 316 supply inputs to each of Polyphase Filters 318, 320, which can provide another null to the filtering.

When a signal is received at Antenna 302, the signal first passes through VGA 304, which has multiple discrete attenuator steps and can provide coarse attenuation steps depending on the strength of the signal. The attenuation can be provided by capacitive ladder structures, which can be controlled by MOS switches. The signal is then combined or mixed with the outputs of LO 340 at Mixers 310, 312. LO 340 is operated in a range designed to down-convert the desired data signal while up-converting the undesired components arising from the coupled power signal. This scheme leads to low power consumption due to signal processing at low frequency. The polyphase network rejects the high frequency up-converted blocker by larger passband bandwidth, leading to low latency. Resistors R31, R32, R35, R36 are placed in series with Mixers 310, 312. These resistors consume a portion of the input signal and swamp out the nonlinear impedance variation of the mixer switches and provide a precise gain for the signal path by using the same type of resistors as used for R33, R34, R37, R38 in the feedback path.

Figure 4A:
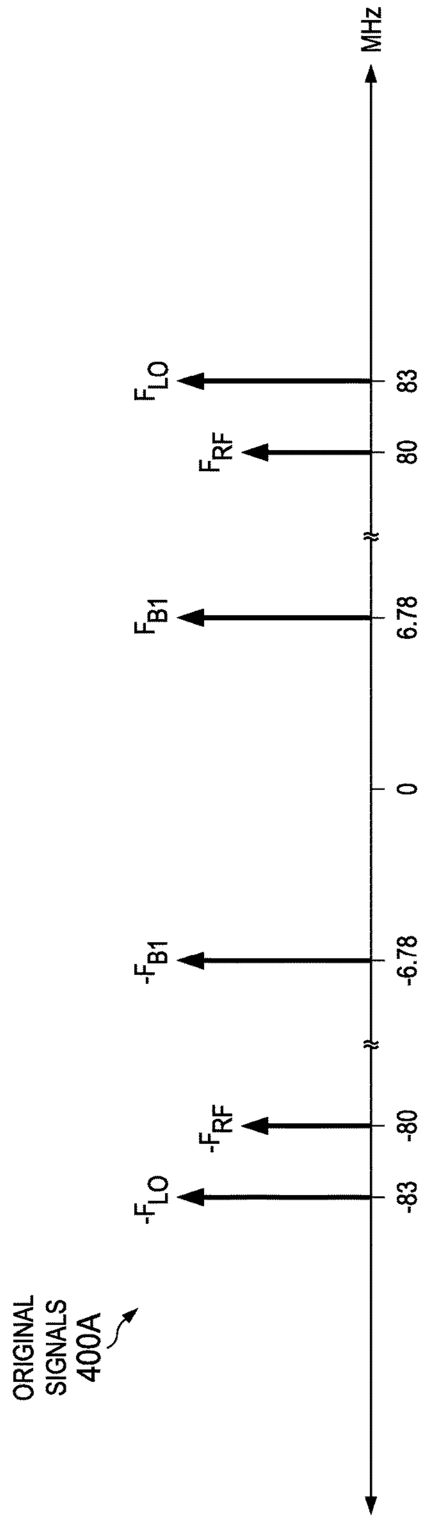
FIG. 4A depicts the data and power signal frequencies incoming to the receiver circuit of FIG. 3 according to an embodiment of the disclosure.
Figure 4B:
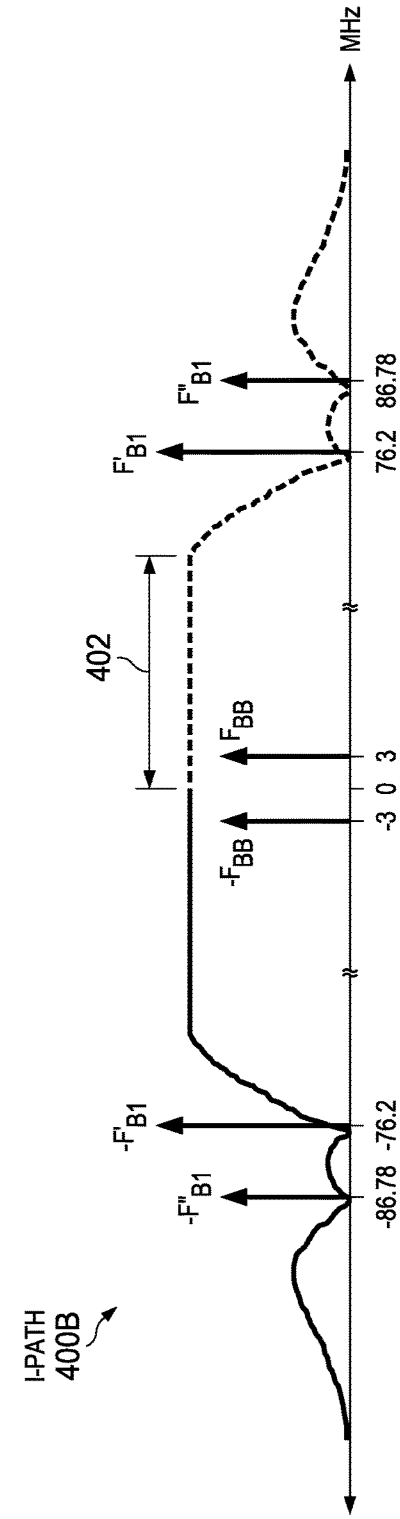
FIG. 4B depicts the frequencies created in the mixers of FIG. 3 according to an embodiment of the disclosure.

FIGS. 4A-B depicts the frequency domain representation of the signals that are input to the mixers of FIG. 3 and those signals output from the mixers. Graph 400A depicts the input signals, which include the data signal having frequency $F_{RF}$, which is e.g., 80 MHz, a blocker signal having frequency $F_{B1}$, at e.g., 6.78 MHz, and the output of LO 340, which operates at frequency $F_{LO}$, which in this example is 83 MHz. When Mixers 310, 312 mix the received signals, the output signals include frequencies $|F_{LO}+F_{RF}|$, $|F_{LO}-F_{RF}|$, $|F_{LO}+F_{B1}|$, and $|F_{LO}-F_{S1}|$. Graph 400B of FIG. 4B depicts representations of these output signals in the frequency domain. In this figure, the down-converted component $|F_{LO}-F_{RF}|$ of the data signal is shown as $F_{BB}$ and has a value of 3 MHz. This value will be used to detect the data. Both components of the block signal are up-converted as shown. $|F_{LO}-F_{B1}|$ is shown here as $F'_{B1}$ and has a value of 76.2 MHz and $|F_{LO}+F_{B1}|$ is shown as $F''_{B1}$ and has a value of 86.78 MHz. The remaining, up-converted data signal, $|F_{LO}+F_{RF}|$ has a value of 163 MHz and is not specifically shown in this figure, as will be explained. The curve shown above these frequency values represents the bandwidths that are passed or filtered out by the polyphase filters. Region 402 represents the frequencies that will be passed by the polyphase filters in both positive and negative values. The stages of Polyphase Filter 318 are then designed to provide nulls at the frequencies represented by $F'_{B1}$ and $F''_{B}$, as shown, with each stage providing a null for one signal. The value of $|F_{LO}+F_{RF}|$ is large enough in this embodiment that this signal lies beyond the Unity Gain Bandwidth (UGB) of Programmable Gain Amplifier 314, which thus obviates the need for another null at this frequency. Thus, through the use of a mixer and polyphase filter, the large amplitude signals are pushed out to higher frequencies and can be cancelled without causing non-linearity issues or consuming much current. This methodology expands the bandwidth at the cost of very little current consumption, making the response very fast.

Figure 5A:
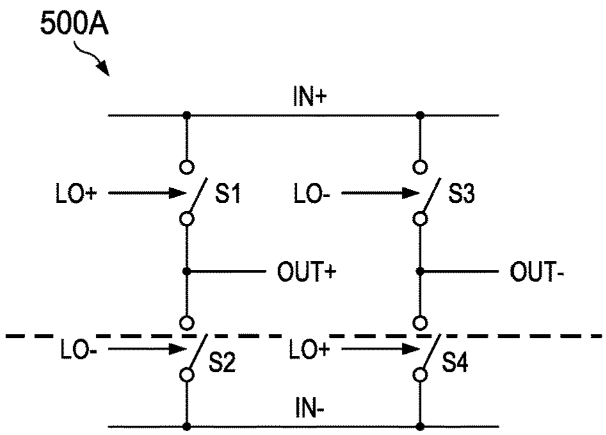
FIGS. 5A-D depict schematics of exemplary blocks of the receiver circuit of FIG. 3 according to an embodiment of the disclosure.
Figure 5B:
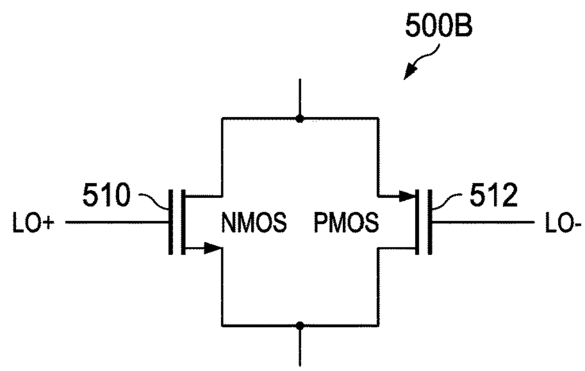

FIGS. 5A-D are used to illustrate example embodiments of various elements of Data Receiver 300. FIG. 5A illustrates an implementation of Switching Mixer 500A, which can be used in at least one embodiment of Mixers 310, 312. Switching Mixer 500A receives differential Input Signals IN+ and IN− and produces differential Output Signals OUT+ and OUT−. These inputs maybe single ended as well, and in that case the second input is connected to a constant potential. Alternatively, the portion of this circuit below the dashed line can be removed. OUT+ is selectively connected to IN+ by Switch S1 and is also selectively connected to IN− by Switch S2. Similarly, OUT− is selectively connected to IN+ by Switch S3 and is also selectively connected to IN− by Switch S4. Switches S1 and S4 are clocked by Signal LO+, while Switches S2 and S3 are clocked by Signal LO−. This means that when LO+ is high, OUT+ is connected to IN+ and OUT− is connected to IN−. Likewise when LO+ is low, OUT+ is connected to IN− and OUT− is connected to IN+. The alternation at frequency LO provides outputs equal to $|F_{LO}+F_{RF}|$ and $|F_{LO}-F_{RF}$. In at least one embodiment, each of Switches S1-S4 is implemented by class AB style NMOS/PMOS parallel switches 500B as shown in FIG. 5B. The use of these parallel switches will accommodate rail-to-rail operations. In one embodiment, NMOS Transistor 510 is clocked, for example, by LO+ and PMOS Transistor 512 is clocked by LO−. In this embodiment, the two clock signals may be overlapping or non-overlapping. In at least one embodiment, both the NMOS and PMOS transistors in the mixers are provided with the same waveform but 90° phase shifted. In this embodiment, the mixer provides an intrinsic "frequency doubler" functionality, and may be clocked from a lower LO frequency, leading to lower power and superior I/Q balance. In at least one alternate embodiment, Mixers 310, 312 are configured to operate as a sub-harmonic mixer with a Phase Locked Loop (PLL) operating at a lower frequency.

Figure 5C:
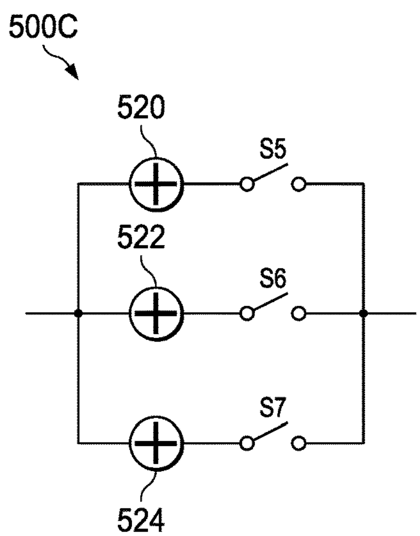
Figure 5D:
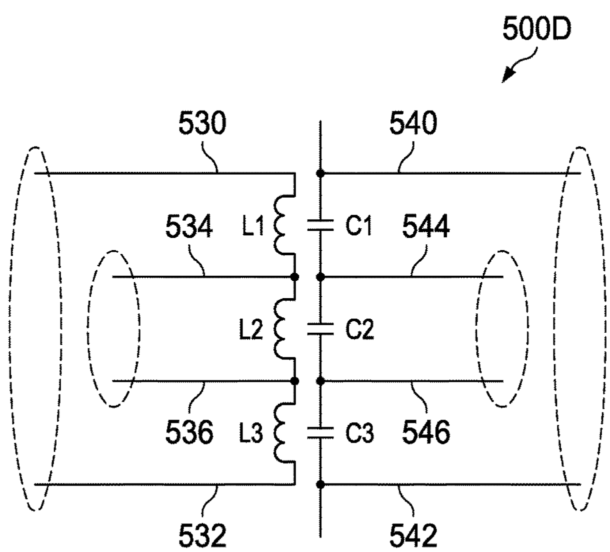

AGC functionality can be implemented in Data Receiver 300 using different methods, several of which are illustrated in FIGS. 5C and 5D. In at least one embodiment, AGC can be implemented by using different ON resistors in different embodiments of Mixers 310, 312. In an example shown in FIG. 5C, Mixer 310 is implemented as Mixer Combination 500C, which includes Mixer Sections 520, 522, 524 connected in parallel A determination can then be made dynamically to select an appropriate one of Mixer Sections 520, 522, 524 using Switches S5, S6, S7.

AGC can also be implemented in Resonator Tank 500D formed by Antenna 302, which serves as an off-chip inductor, and on-chip capacitors, as shown in FIG. 5D. This embodiment shows both the inductor and the capacitor being segmented and therefore able to be tapped at different locations, but one skilled in the art will recognize that one or both of these methodologies can be implemented. In at least one embodiment, a combination of N capacitors, e.g., Capacitors C1, C2, C3, is connected in series across the LC tank. Intermediate nodes of these N series connected capacitors can be tapped to provide coarse AGC functionality. In one instance, Taps 540, 542 are used to provide the combined capacitance of C1, C2, C3 and in another instance, Taps 544, 546 are used to provide the capacitance of C2 only. Overall, the equivalent capacitance of the N series capacitors is much smaller and does not load the main resonator tank; this can be viewed as a "capacitive transformer".

In at least one embodiment, e.g., when the inductor is implemented using a thick copper layer, the AGC functionality may also be implemented by providing Intermediate Nodes 534, 536 between Terminals 530, 532 of the inductor, forming three Inductor Segments L1, L2, L3. The inductor can then be tapped either at Terminals 530, 532 or at Intermediate Nodes 534, 536. Additional gain control can be provided by programming the feedback resistance of Amplifiers 314, 316. The resistances are typically large, and can be trimmed with small size MOS transistors. In the disclosed embodiments, the inductive coil always 'sees' the same impedance, which is almost invariant with respect to AGC settings at the input, providing almost no loading to the system.

Figure 6:
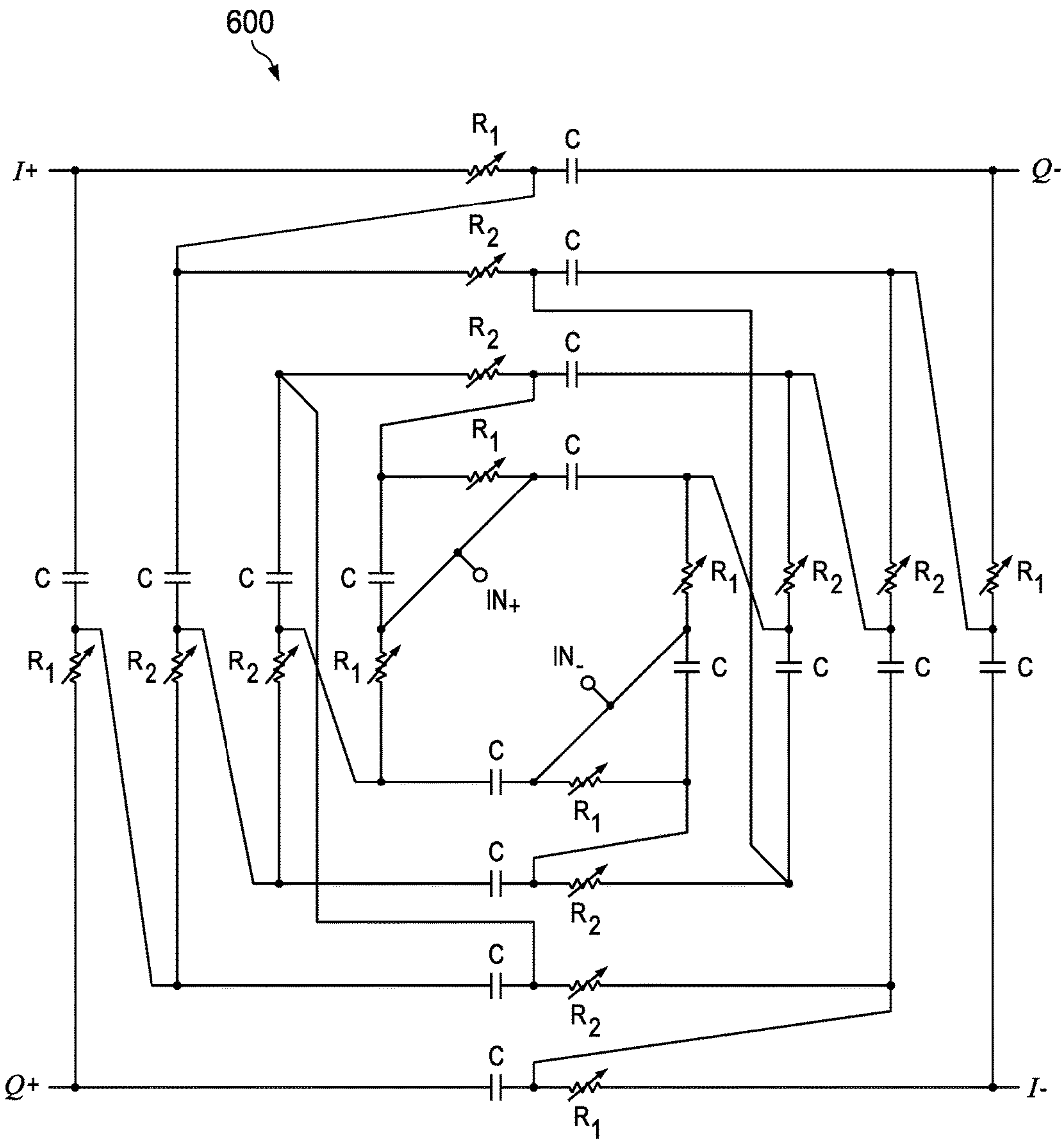
FIG. 6 depicts a stage of a polyphase filter according to an embodiment of the disclosure.
Figure 7A:
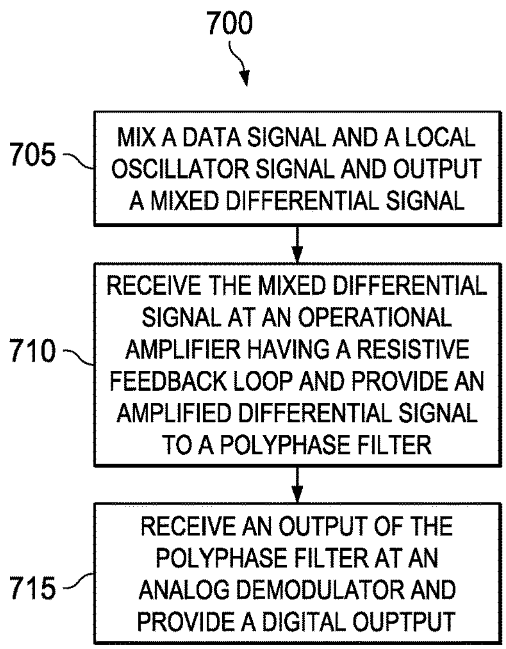
Figure 7B:
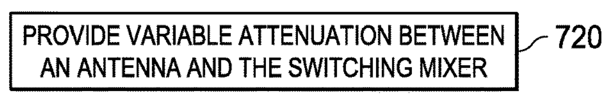
Figure 7C:
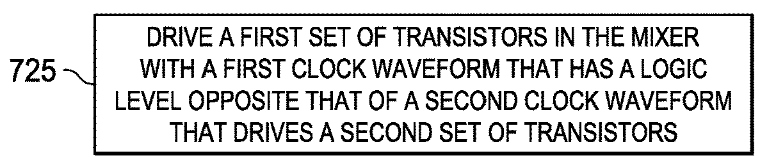
Figure 7D:
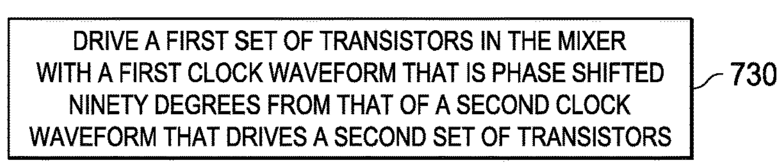

FIG. 6 depicts Polyphase Filter 600, which can have 2N stages cascaded, where N is an integer representing the number of nulls to be provided by the filter. As shown, Polyphase Filter 600 has four stages, with each stage comprising a ring of capacitors and resistors. The first N stages, e.g., two, use one phase sequence or cyclic sequence and the next N stages use a different phase sequence. In this example embodiment, the first two stages use the phase sequence, read clockwise in the diagram, of: I+, Q−, I−, Q+ and the next two stages use the phase sequence I−, Q−, I+, Q+. That is, the phase sequences are still cyclic, but I+ and I− have been swapped to accommodate negative frequencies. Referring back to FIG. 4B, the first two stages of Polyphase Filter 600 are used to null out the frequencies for $F_{B1}$ and $F''_{B1}$ while the second two stages null out the frequencies for $-F'_{B1}$ and $-F''_{B1}$. In at least one embodiment, the cyclic phases are differential quadrature at both their input and outputs (i.e. 0°, 90°, 180°, 270° at the input and 0°, 90°, 180°, 270° at the output). In at least one embodiment, the cyclic phases are differential in both input and output (i.e. 0°, 180° at the input and 0°, 180° at the output). In at least one embodiment, the cyclic phases are differential at the input and differential quadrature at the output (i.e. 0°, 180° at the input and 0°, 90°, 180°, 270° at the output).

The multi-stage passive poly-phase filter provides filtering of the frequency up-converted power path noise and may use one or multiple sections depending on the process spread and the required frequency accuracy of the system. The polyphase filter components, which are typically resistors, may be trimmed for better quadrature balance. Additionally, Polyphase Filters 318, 320 can be implemented with large resistors, as the associated noise is reduced by the gain of Programmable Gain Amplifiers 314, 316. A change in the phasor sequence of the filter stages can either nullify a signal or magnify the magnitude of the signal. This property can be used to provide nulling of the blocker signal in Polyphase Filter 318 to isolate the data signal and to provide nulling of the data signal in in Polyphase Filter 320 to isolate the blocker signal. This property can also be used to provide a symmetric frequency response within a filter. In at least one embodiment, the first two stages of Polyphase Filter 318 are rotated in one direction and remaining stages are rotated in opposite direction, leading to formation of null at both positive and negative frequencies created from the power path signal. In at least one embodiment, Polyphase Filter 318 provides a cascade of two asymmetrical low pass band-stop polyphase stages to realize a symmetric band-stop filter for blocker rejection. Hence, a strong blocker rejection can be achieved without the need for multistage active filter. Polyphase Filter 320 is designed with appropriate filters to filter out the data signal, leaving an up-converted version of the blocker signal. If noise is a concern, additional gain can be provided before the polyphase network. In at least one embodiment in which noise is not a concern, the polyphase network is placed between Antenna 302 and VGA 304. In addition, the input and output DC voltages in a polyphase network are same, leading to no further adjustments in the common mode of the signal. Hence, the common mode setting is performed only at one place in the entire architecture, leading to low area and lower latency from the power management unit at the start-up phase.

Polyphase filter time constants are set equal to the equivalent up-converted frequency of the blocker signal, leading to lower area requirements on silicon while not being limited by the baseband bandwidth. Data Receiver 300 accordingly has a very fast response and the system can significantly reduce system latency. In at least one embodiment, the latency is about 10 nanoseconds. This lower latency also leads to a fast automatic gain control algorithm in the receiver.

In one embodiment, Polyphase Filter A 318 is designed to pass a bandwidth that includes the down-converted data signal $|F_{LO}-F_{RF}|$ at 3 MHz and to remove the other components, i.e. $|F_{LO}+F_{RF}|$, $|F_{LO}-F_{B1}|$, and $|F_{LO}-F_{B1}$ with Signals I and Q used to detect the data signal. Similarly, Polyphase Filter B 320 is designed to pass the up-converted blocker signal, with Signals I' and Q' used to detect the blocker signal. The difference between the data signal and the blocker signal can be used to monitor SNR and perform fast AGC. Polyphase Filter C 322 shows an alternate connection that can be used to perform peak detection at RF, which is faster. The position of the polyphase filter, either before or after Mixer 310 is determined by the SNR required; if the polyphase filter is not necessary, it can be completely disabled using MOS switches. The polyphase network does not provide bandwidth limitation, nor does it provide noise filtering, as the RC product is referred to the up-converted blocker frequency; leading to a trade-off between fast response and sensitivity. In at least one embodiment, Polyphase Filter 318 is combined with the feedback network of Programmable Gain Amplifier 314. Applicant notes, however, that keeping these two elements separate as shown in FIG. 3 allows front-end gain and the null frequency of Polyphase Filter 318 to be adjusted independently, leading to a robust implementation.

The output of the disclosed architecture is available in quadrature phases and may use single ended or differential outputs. This allows easy interfacing with the digital back-end logic that performs the functions of modulation and demodulation. The architecture is quite robust for two level modulations of amplitude, phase or frequency, e.g. ASK, FSK, PSK thereby providing scalability for future systems or technologies.

The DC offset of Programmable Gain Amplifiers 314, 316 can be corrected from the output of the receiver using the feedback resistance network. Additionally, the common mode of Mixers 310, 312, Programmable Gain Amplifiers 314, 316 and DMOD 324, 326, 328, 330 are all set by the common mode of Programmable Gain Amplifiers 314, 316, which leads to the low area requirements, low current consumption overhead and low power overhead of Data Receiver 300.

Data Receiver 300 operates from the lowest possible supply voltage and lowest current, as Programmable Gain Amplifiers 314, 316 are the only active stages that sustain the full dynamic range. The disclosed architecture) also achieves low distortion. Data Receiver 300 uses deterministic blocker frequency (i.e. known a-priori for the application) and operates with large signal levels; large resistors can therefore be used without providing a noise penalty. This reduces area and loading to the main tank, as well as the overall budget for parasitic capacitances from capacitors.

FIGS. 7A-7I depict a method 700 for providing wireless data transfer in the presence of wireless power transfer. The method begins with mixing (705) a data signal and a local oscillator signal and outputting a mixed differential signal. A programmable gain amplifier providing gain using an OTA and resistive feedback receives (710) the mixed differential signal and provides an amplified differential signal to a polyphase filter. An analog demodulator receives (715) an output of the polyphase filter and provides a digital output. Additional actions of the method can be provided in various combinations and are not shown in any specific order. The method can include providing (720) variable attenuation between an antenna and the switching mixer. The method can further include driving (725) a first set of transistors in the mixer with a first clock waveform that has a logic level opposite that of a second clock waveform that drives a second set of transistors. Alternatively, the method can include driving (730) a first set of transistors in the mixer with a first clock waveform that is phase shifted ninety degrees from that of a second clock waveform that drives a second set of transistors. In at least one embodiment, the method includes providing (735) gain control at least in part by selecting taps of a plurality of taps to change capacitance in a main resonator tank that comprises an off-chip inductor and a plurality of on-chip capacitors connected in series. In at least one embodiment, the method includes providing (740) gain control at least in part by selecting taps of a plurality of taps to change inductance in a main resonator tank that comprises an off-chip inductor and an on-chip capacitor. In at least one embodiment, the method includes providing (745) gain control at least in part by enabling a mixer section of a plurality of mixer sections connected in parallel, each of the mixer sections having a different ON resistance. In at least one embodiment, the method includes providing (750) gain control at least in part by trimming a feedback resistance of the operational amplifier. In at least one embodiment, the method includes setting (755) a time constant for the polyphase filter equal to an equivalent up-converted frequency of a blocker signal.

The disclosed embodiments of a data path receiver for a wireless power transfer system may provide one or more of the following advantages. The receiver has the ability to self-tune, is flexible, and rejects harmonics and provides a higher data rate than previous receivers for coupled data and power transfer. Signals are processed at LO frequency. There is no need for external components, as the receiver is fully integrated. The receiver consumes very low power; the front end is running on lower a voltage and there are fewer components.

In at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Other blocks may also be added or inserted between the blocks that are illustrated. Whereas some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A receiver for data communication in a wireless power transfer system comprising:

a mixer having a first input, a second input, and an output, the first input being adapted to receive a first signal at a first frequency and a first amplitude and a second signal at a second frequency and a second amplitude, the first frequency being lower than the second frequency and the first amplitude being higher than the second amplitude;

a local oscillator having an output providing a third signal at a third frequency higher than the second frequency, the local oscillator output being coupled to the second input of the mixer;

the mixer output providing a mixed differential signal;

a programmable gain amplifier including an operational transconductance amplifier (OTA) and resistive feedback, the OTA having an input coupled to the mixer output and having an output providing an amplified differential signal;

a polyphase filter having an input coupled to the output of the programmable gain amplifier and having an output; and an analog demodulator having an input coupled to the output of the polyphase filter and having an output providing a digital output.

2. The receiver as recited in claim 1 including a variable gain attenuator coupled between an antenna and the first input of the mixer.

3. The receiver as recited in claim 2 in which the mixer includes an NMOS transistor and a PMOS transistor connected in parallel and a first clock waveform driving the NMOS transistor has a logic level opposite that of a second clock waveform driving the PMOS transistor.

4. The receiver as recited in claim 3 in which the first clock waveform and the second clock waveform are non-overlapping.

5. The receiver as recited in claim 2 including a main resonator tank including an off-chip inductor and an on-chip capacitor, in which the off-chip inductor includes a plurality of taps and further in which gain control is provided at least in part by selecting taps off the inductor.

6. The receiver as recited in claim 2 in which the polyphase filter has 2*N stages wherein N is an integer and further in which the first N stages use a first cyclic sequence of quadrature differential phases and the second N stages use a second cyclic sequence of the quadrature phases.

7. The receiver as recited in claim 6 in which the cyclic phases are one of a group including a) differential quadrature at both input and output, b) differential in both input and output, and c) differential at input and differential quadrature at output.

8. The receiver as recited in claim 2 in which the mixer includes a plurality of mixer sections connected in parallel, each of the mixer sections having a different ON resistance and further in which gain control is provided at least in part by enabling a mixer section of the plurality of mixer sections.

9. The receiver as recited in claim 2 in which gain control is provided at least in part by trimming a feedback resistance of the operational amplifier.

10. The receiver as recited in claim 2 in which a time constant for the polyphase filter is set equal to an equivalent up-converted frequency of a blocker signal.

11. The receiver of claim 1 in which the first signal is a power signal, the first frequency is 6.78 MHz, the second frequency is 80 MHz, the third frequency is 83 MHz, the fourth frequency is 76.2 MHz, the and fifth frequency is 3 MHz.

12. A method of providing isolated wireless data transfer in the presence of wireless power transfer, the method comprising:

receiving an input signal that includes a power signal at a first frequency and a first amplitude and a data signal at a second frequency and a second amplitude, the first frequency being lower than the second frequency and the first amplitude being higher than the second amplitude;

providing a local oscillator signal at a third frequency higher than the second frequency;

mixing the input signal and the local oscillator signal and outputting a mixed differential signal, the mixed differential signal including the power signal at a fourth frequency higher than the first frequency and the data signal at a fifth frequency lower than the first frequency;

receiving the mixed differential signal at a programmable gain amplifier that uses an operational transconductance amplifier (OTA) and resistive feedback and providing an amplified differential signal to a polyphase filter; and receiving an output of the polyphase filter at an analog demodulator.

13. The method as recited in claim 12 including providing variable attenuation between an antenna and the mixer.

14. The method as recited in claim 13 including driving a first set of transistors in the mixer with a first clock waveform that has a logic level opposite that of a second clock waveform that drives a second set of transistors.

15. The method as recited in claim 13 including providing gain control at least in part by selecting taps of a plurality of taps to change inductance in a main resonator tank that includes an off-chip inductor and an on-chip capacitor.

16. The method as recited in claim 13 including providing gain control at least in part by enabling a mixer section of a plurality of mixer sections connected in parallel, each of the mixer sections having a different ON resistance.

17. The method as recited in claim 13 including providing gain control at least in part by trimming a feedback resistance of the operational amplifier.

18. The method as recited in claim 13 including setting a time constant for the polyphase filter equal to an equivalent up-converted frequency of a blocker signal.

19. The method of claim 12 in which the first frequency is 6.78 MHz, the second frequency is 80 MHz, the third frequency is 83 MHz, the fourth frequency is 76.2 MHz, the and fifth frequency is 3 MHz.

20. A system for isolated wireless power and data transfer, the system comprising:

a power transmitter;

a power receiver;

a data transceiver comprising a transmitter and a receiver, the receiver comprising:

a mixer having an input signal input, a local oscillator signal input, and a mixed differential signal output, the input signal input receiving a power signal at a first frequency and a first amplitude and a data signal at a second frequency and a second amplitude, the first frequency being lower than the second frequency and the first amplitude being higher than the second amplitude, the local oscillator signal input receiving a local oscillator signal at a third frequency higher than the second frequency, and the mixed differential signal output providing the power signal at a fourth frequency higher than the first frequency and the data signal at a fifth frequency lower than the first frequency, a programmable gain amplifier including an operational transconductance amplifier (OTA) and resistive feedback, the OTA having an input coupled to receive the mixed differential signal and to provide an amplified differential signal, a polyphase filter having an input coupled to the output of the OTA and an output; and an analog demodulator having an input coupled to the OTA output to demodulate the output of the polyphase filter and provide digital output.

21. The system of claim 20 in which in which the first frequency is 6.78 MHz, the second frequency is 80 MHz, the third frequency is 83 MHz, the fourth frequency is 76.2 MHz, the and fifth frequency is 3 MHz.

* * * * *